H. VANDERBEEK.
OIL CLOSURE FOR SHAFT BEARINGS.
APPLICATION FILED SEPT. 3, 1920.
1,370,861.
Patented Mar. 8, 1921.
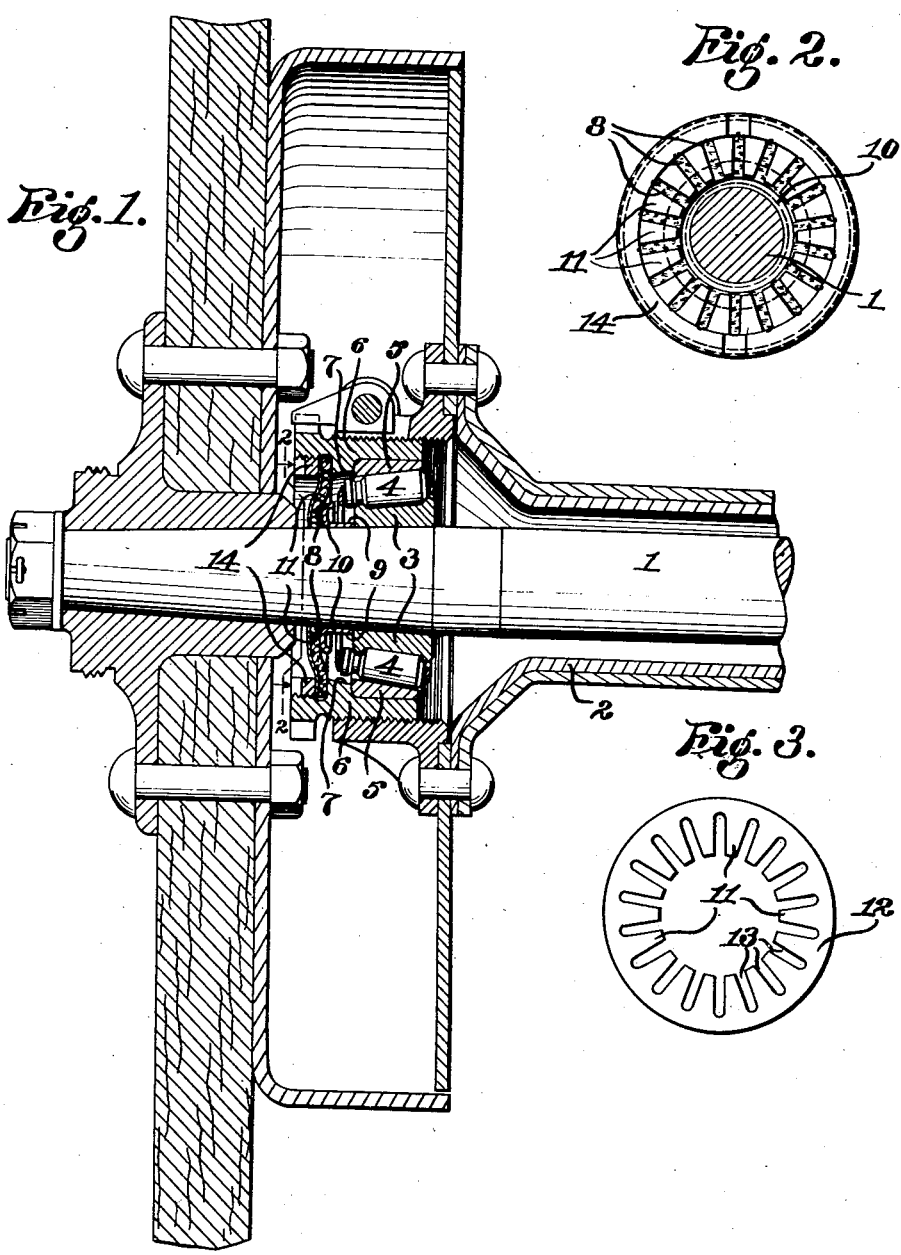

UNITED STATES PATENT OFFICE.

HERBERT VANDERBEEK, OF DETROIT, MICHIGAN, ASSIGNOR TO THE TIMKEN-DETROIT AXLE COMPANY, OF DETROIT, MICHIGAN, A CORPORATION OF OHIO.

OIL-CLOSURE FOR SHAFT-BEARINGS.

1,370,861.  Specification of Letters Patent.  Patented Mar. 8, 1921.

Application filed September 3, 1920. Serial No. 407,827.

*To all whom it may concern:*

Be it known that I, HERBERT VANDERBEEK, a citizen of the United States, and a resident of the city of Detroit, in the county of Wayne and State of Michigan, have invented a new and useful Improvement in Oil-Closures for Shaft-Bearings, of which the following is a specification.

My invention relates to shaft bearings and has for its object to provide a simple, economical and efficient device for preventing the escape of lubricant endwise of the shaft. The invention consists principally in a novel clamping device for securing an oil closure in position over the end of such bearings. The invention further consists in the parts and combinations of parts hereinafter described and claimed.

In the drawings, which form part of this specification and wherein like reference characters indicate like parts wherever they occur, Figure 1 is a sectional view of an axle bearing provided with an oil closure embodying my invention;

Fig. 2 is a sectional view on the line 2—2 of Fig. 1; and

Fig. 3 is an elevation of the ring which holds the closure ring.

In the drawings, my invention is illustrated as applied to an automobile axle bearing of the conical roller type. The shaft 1 is rotatably mounted in a housing 2 and projects therefrom. Said housing is adapted to contain lubricant for the bearing. On the outer end portion of the shaft 1 is mounted an inner bearing member or cone 3 for conical rollers 4. The outer bearing member or cup 5 for said rollers is arranged in a tubular sleeve 6 in the housing. Preferably the housing is interiorly threaded to receive said sleeve so that the bearing may be adjusted. The bore of said sleeve 6 is provided with an annular rib 7. The inner side of said rib 7 constitutes a shoulder against which the outer end of the bearing cup 5 abuts, and the other side of said rib constitutes a shoulder against which the outer peripheral portion of a flexible closure ring 8 preferably of cork composition or other oil resisting material is held.

The shaft 1 is provided with a collar 9 which rotates therewith. The inner end of said collar 9 abuts against the outer end of the bearing cone 3, and the outer end of said collar is curled outwardly or formed into an annularly corrugated flange 10 which constitutes an abutment for the inner portion of the closure ring 8 to bear against flatwise. In order to make a better seal between the closure ring 8 and the rounded end 10 of said collar 9, said end 10 is preferably positioned outwardly (longitudinally of the shaft) beyond the plane of said closure ring, whereby said ring is distended and dished outwardly over said rounded end. Thus the annular space between the outer shoulder of the annular rib 7 and the flange 10 of the collar 9 is closed by said ring 8; and in order more thoroughly to prevent leakage, this closure ring 8 is pressed against said rounded flange 10 of the collar 9 by a multiplicity of springs 11 operating throughout the inner periphery of said closure ring. Preferably these spring members 11 are integral with a metal ring 12 and are formed by providing said ring with a plurality of slots 13 extending radially outwardly from its inner periphery.

The metal ring 12 is disposed in contact with the closure ring 8. The adjusting sleeve 6 is interiorly threaded to receive a clamping nut 14 which forces said rings together and forces the closure ring 8 against the shoulder of the annular rib 7. The spring fingers 11 are long enough to reach substantially to the inner periphery of the closure ring, and are under tension, so as to press said closure ring against the collar 9.

In the construction illustrated, the shoulder of the annular rib 7 is offset with respect to the flange of the collar, as above described, and the outer peripheries of the closure ring and of the metal ring are forced toward said shoulder by the clamping nut, with the result that the inner periphery of the closure ring and the end portions of the spring fingers are bulged outwardly and placed under tension. Obviously, it would be possible to change this construction so as to provide the spring action in other ways, as by disposing the collar and the annular rib in the same, or substantially the same, plane and dishing the metal ring 12 to place the fingers under tension.

The spring fingers 11 press the closure ring against the outer face of the flange 10 of the collar 9. The fingers 11 act individually and thus hold the closure ring against the flange at a multiplicity of points, taking care of inequalities in the thickness of the closure ring and of said flange. While the shaft and collar rotate, the closure ring is able to yield at any point to accommodate any projecting portion of the flange of the collar due to any irregularity in its construction, without permitting leakage of oil.

My device is applicable to shaft bearings generally. It prevents waste of oil and thus provides better lubrication for the bearings. The closure ring can be easily and quickly replaced whenever necessary.

It is obvious that numerous changes may be made without departing from the invention and I do not wish to be limited to the precise construction shown.

What I claim is:

1. Means for preventing the escape of lubricant endwise of a shaft, comprising a housing, a shaft therein and projecting therefrom, a ring of flexible material whose periphery is tightly secured to said housing, an annular member on said shaft disposed in contact with the inner portion of said flexible ring, and a ring secured to said housing and having a multiplicity of spring fingers adapted and arranged to press the inner portion of said flexible ring against said annular member.

2. In an axle construction comprising a housing and a shaft section rotatably mounted therein and projecting therefrom, an oil sealing device comprising a flexible closure ring and a ring alongside thereof provided with a multiplicity of inwardly extending spring fingers and means for securing the outer margins of said rings to said housing, said shaft having a member thereon which radially overlaps the inner margins of said rings and said spring fingers to force said inner portion against said member to seal the same.

3. A housing having an annular rib in the bore thereof, a shaft rotatably mounted in said housing, a conical roller bearing interposed between said shaft and said housing and comprising a bearing cup abutting against the inner face of said annular rib, and an oil sealing device comprising a flexible closure ring adapted to be held tightly against the outer face of said annular rib, a member on said shaft adapted to radially overlap the inner margin of said closure ring and dished outwardly by said member, and a ring having a plurality of spring fingers adapted and arranged to press said inner margin of said closure ring against said member on said shaft.

4. The combination of an axle housing, having an annular rib therein, a shaft rotatably mounted therein, and projecting therefrom, a conical roller bearing located between said shaft and housing and comprising an outer bearing member which abuts against the inner face of said rib, a collar mounted on said shaft with its outer end beyond the outer face of said rib, a closure ring disposed against the outer face of said annular rib and the outer end of said collar, and a ring alongside of said closure ring provided with a multiplicity of spring fingers, whereby the outer periphery of said closure ring is held tightly against said annular rib and the inner periphery of said closure ring is pressed against said collar at a multiplicity of points.

5. An axle housing, a shaft rotatably mounted therein and projecting therefrom, an annular rib in said housing, a collar on said shaft whose outer face is beyond the outer face of said annular rib, a closure ring of flexible material bearing against said annular rib and said collar, and a ring alongside of said closure ring, said ring being provided with a multiplicity of spring fingers, in position to bear said closure ring against the end of said collar.

6. An axle housing, a shaft rotatably mounted therein and projecting therefrom, a conical roller bearing interposed between said shaft and housing, an annular rib in said housing, a collar on said shaft, a closure ring of flexible material adapted to bear against said annular rib and said collar, and a ring alongside of said closure ring, said ring being provided with a multiplicity of inwardly extending spring fingers, whereby the outer periphery of said closure ring is held against said annular rib by said ring and the inner periphery thereof is held against said collar by said spring fingers.

Signed at Detroit, Michigan, this 31st day of August, 1920.

HERBERT VANDERBEEK.